W. W. McKAY.
Automatic Gate.

No. 167,003. Patented Aug. 24, 1875.

WITNESSES:
A. W. Almquist
A. F. Terry

INVENTOR:
W. W. McKay
BY
ATTORNEYS.

UNITED STATES PATENT OFFICE.

WILLIAM W. McKAY, OF OSSIAN, IOWA.

IMPROVEMENT IN AUTOMATIC GATES.

Specification forming part of Letters Patent No. 167,003, dated August 24, 1875; application filed July 3, 1875.

*To all whom it may concern:*

Figure 1:
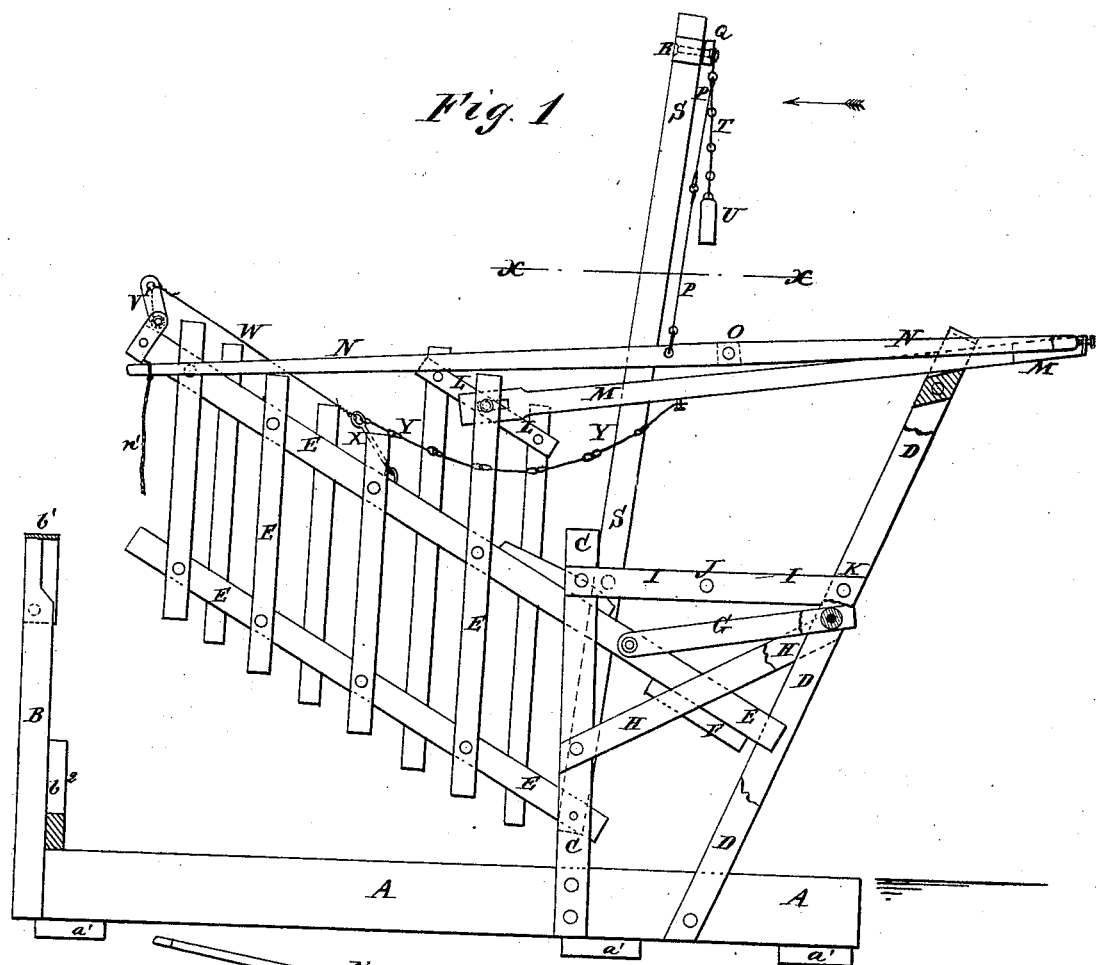
Figure 2:
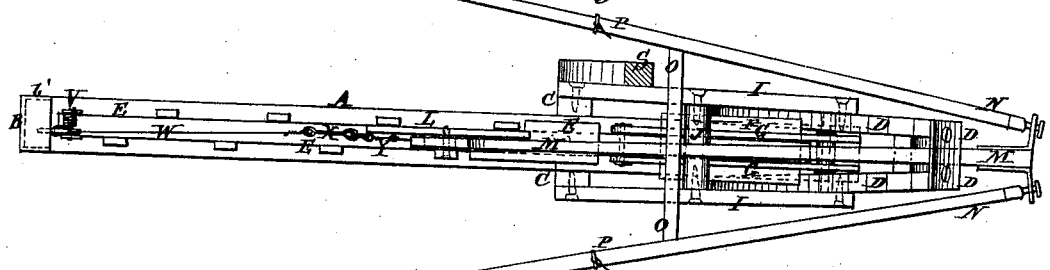
Figure 3:
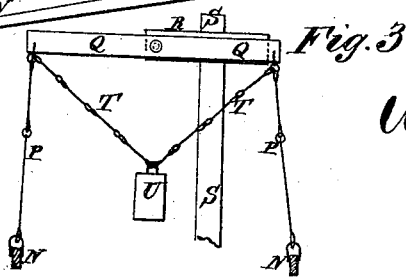

Be it known that I, WILLIAM W. McKAY, of Ossian, in the county of Winneshiek and State of Iowa, have invented a new and useful Improvement in Gates, of which the following is a specification:

Figure 1 is a side view of my improved gate, parts being broken away to show the construction. Fig. 2 is a top view of the same, partly in horizontal section, through the line $x\ x$, Fig. 1. Fig. 3 is a detail view of the device for balancing the operating-levers, and bringing them back to their normal position when released.

Similar letters of reference indicate corresponding parts.

The object of this invention is to furnish an improved gate, which shall be so constructed that it may be readily opened by a person in a vehicle or upon horseback, and again closed after the said vehicle or horse has passed through, and which shall be simple in construction and reliable in operation.

The invention consists in the combination of the pivoted bars and the guide-bars with the rearwardly-projecting weighted end of the upper longitudinal bar of the gate, and with the two pairs of posts; in the combination of the pivoted sliding bar and the operating-levers with the gate, and with the rear pair of posts; in the combination of the pivoted bar, the chains, and the weight with the levers by which the sliding bar is operated to open and close the gate.

A is the base-sill of the gate, to which the posts B C D are attached, which may be used or not, as desired. When the sill A is used it should have cross-sills $a'$ attached to it to rest upon, and be staked to the ground so as to make the gate portable. When the sill A is not used the posts B C D should be set in the ground. E is the gate, which is formed by pivoting vertical cross-slats to two longitudinal bars. The rear end of the lower longitudinal bar of the gate E is pivoted to and between the two parallel upright posts C. The rear end of the upper longitudinal bar of the gate E projects to the rearward of said posts C, and has a balancing-weight, F, attached to it. To the opposite sides of the upper longitudinal bar of the gate E, a little in the rear of the posts C, are pivoted the forward ends of the two bars G, the rear ends of which are pivoted to and between the two parallel posts D, and are kept at the proper distance apart by a block or washer interposed between the said rear ends. This construction enables the gate to shut or fold together into a compact form as it rises. The gate E is kept in the same vertical plane as it moves up and down by the two inclined guide-bars H attached to the posts C D, and between which the rear end of the upper longitudinal bar of the said gate E moves. The upper end of each post C is connected with its corresponding post D by a bar, I, by which the said posts are held in their proper relative positions. The posts C D upon the two sides are kept from spreading apart by the bolt J, attached to the middle parts of the two bars I, and by the bolt K, attached to the rear ends of the bars I, and to the rear posts D. Two or three of the rear cross-bars of the gate E project upward, and to them is pivoted a short bar, L, which is placed parallel with the longitudinal bars of said gate. To the bar L is pivoted the forward end of the bar M, the rear end of which passes back through a guide-space between the upper ends of the rear posts D, and rests upon a block interposed between the said posts D. To the opposite sides of the rear end of the bar M, or to eye-plates attached to said rear end, are pivoted the rear ends of two levers, N, which project forward upon opposite sides of the gate E, and incline outward or from the gate, so that their free ends may be at such a distance from the gate that a person sitting in a carriage may reach the end of the lever to operate it. The free ends of the levers N may have hanging cords $n'$ attached to them, to enable them to be operated by a person sitting in a sleigh or low carriage. The levers N are held at the proper distance apart by a cross-bar, O, the ends of which are attached to the said levers. The levers N are supported at the proper height by two chains, P, the upper ends of which are attached to the ends of a bar, Q, which is pivoted at its center to a cross-arm, R, attached to the upper end of the post S. The lower part of the post S is attached to the bars I H, or to one of the posts C, or may be set in the ground.

To the ends of the pivoted bar Q are attached the upper ends of two chains, T, the lower ends of which are brought together, and are attached to a weight, U, so as to bring the levers N back to their proper position when released after being operated to open or close the gate. The pivoted bar Q may be replaced by pulleys for the chains to pass over, if desired.

By this construction the gate will be opened by a slight longitudinal push upon either of the levers N, and will be closed by a slight longitudinal pull upon either of said levers.

To the forward end of the upper longitudinal bar of the gate E is attached a spring-catch, V, which, when the gate E is lowered or shut, springs in beneath a cap, $b^1$, attached to the forward or latch post B, or into a notch or mortise formed in said post. To the spring-catch V is attached a wire, rod, or chain, W, the rear end of which is attached to the end of a short rod or long link, X, the other end of which is pivoted to the upper longitudinal bar of the gate E. To the forward end of the rod or link X is attached the end of a chain, Y, which extends back beneath the bar M, and its rear end is attached to the under side of the said bar M. The forward end of the bar M is slotted to receive its pivot, so that when the levers N are pushed back to open the gate the first effect will be to draw back the spring-catch V, and the second effect will be to open the gate E. To the inner side of the front or latch post B is attached a block, $b^2$, in the upper end of which is formed a V-shaped notch to receive the forward end of the lower horizontal bar of the gate E, to support the said forward end of the gate.

Having thus described my invention, 1 claim as new and desire to secure by Letters Patent—

1. The combination of the pivoted bars G and the guide-bars H with the rearwardly-projecting weighted end of the upper longitudinal bar of the gate E, and with the two pairs of posts C D, substantially as herein shown and described.

2. The combination of the slotted sliding bar M and the levers N with the gate E, and with the rear pair of posts D, substantially as herein shown and described.

3. The combination of the pivoted bar Q, the chains P and T, and the weight U with the levers N, by which the sliding bar M is operated to open and close the gate, substantially as herein shown and described.

WILLIAM W. McKAY.

Witnesses:
D. G. TRACY,
GEORGE W. McKAY.